June 5, 1934.   W. E. REYNOLDS ET AL   1,961,913
COLORIMETER
Filed June 12, 1930
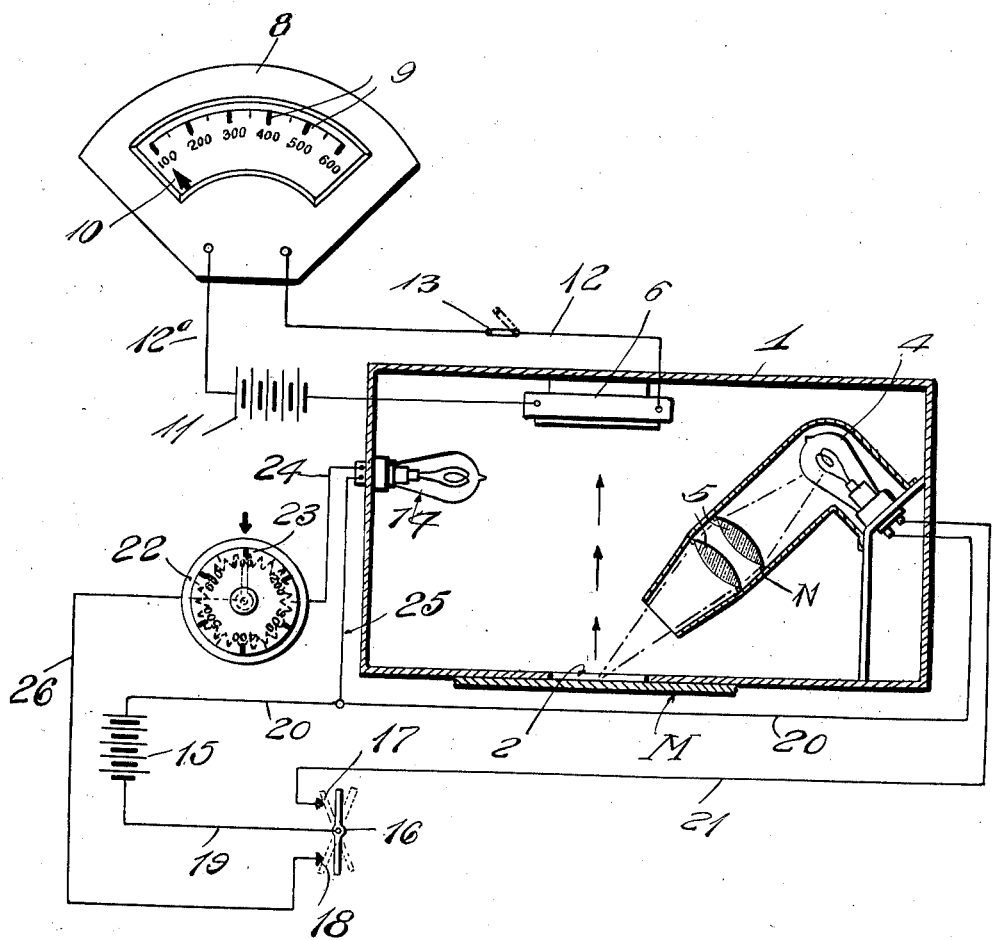
INVENTORS
William E. Reynolds.
Arthur R. Hext.
By Frank C. Fearman.
ATTORNEYS.

Patented June 5, 1934

1,961,913

UNITED STATES PATENT OFFICE 1,961,913

COLORIMETER

William E. Reynolds and Arthur R. Hext, Alma, Mich.

Application June 12, 1930, Serial No. 460,699

7 Claims. (Cl. 88—14)

The present invention relates to improvements in colorimeters and has for its principal object to provide an apparatus by means of which colors may be accurately tested, matched, compared, recorded and numbered.

More particularly, the present invention resides in the provision of a means for measuring the intensity of the light reflected from a piece of colored material.

A further and important object is to provide a colorimeter of the above mentioned character that will at all times be positive and efficient in its operation, the same being further simple in construction, and strong and durable.

Another salient and prime object of the present invention is to provide a colorimeter including a measuring instrument, and a comparison light and color indicating dial for cooperation with the aforementioned instrument, in order to insure the accurate testing, matching or comparison of the color of the material being subjected to the light rays.

A further object is to provide a colorimeter so designed and constructed that the final determination or reading, which is the key number to indicate the shade or color of the material being tested will be uniform and constant on all machines or colorimeters regardless of the condition, (within the useful range) of the batteries used, and regardless of the number of machines or colorimeters used in testing the color of the material.

With the above and other objects in view, the present invention consists in the combination and arrangement of parts, hereinafter more fully described, illustrated in the accompanying drawing, and particularly pointed out in the appended claims, it being understood that changes may be made in the form, size, proportion, and minor details of construction, without departing from the spirit, or sacrificing any of the advantages of the invention.

In the accompanying drawing wherein like reference characters indicate corresponding parts throughout, the figure represents a diagrammatic view, the case being shown in section.

In the drawing wherein for the purpose of illustration is shown the preferred embodiment of our invention, the numeral 1 designates a substantially light-tight case that is provided with an opening 2 in the bottom thereof for the presentation of the material whose color is to be tested. The material in the present instance is designated by the letter "M" and is shown disposed against the bottom face of the case covering the opening 2.

Arranged within one end of the case 1 is an incandescent light bulb 4, said bulb being mounted in a housing "N", so that the light rays will be directed downwardly at an angle toward the opening 2 in the bottom of the case. Suitable condensing lenses 5 are also arranged in the housing for disposition within the path of the light rays for focusing said light rays on the material or object being tested and as shown in the drawing.

Mounted in the upper portion of the case 1 directly above the opening 2 is a selenium cell 6, the same being of the conventional construction.

While we have specifically shown a selenium cell as being arranged within the case 1, it is understood that a photo-electric cell may be employed in lieu of the selenium cell. A measuring instrument in the form of a galvanometer designated by the numeral 8 is arranged in circuit with the selenium cell 6. The scale of this galvanometer is shown at 9 and the indicating arrow that moves across the scale is shown at 10. The numeral 11 designates the battery employed for energizing the selenium cell, while 12 and $12^a$ respectively, denote the electric leads from the selenium cell to the galvanometer, a switch 13 being provided in the lead 12 for operation as usual.

A comparison light 14 also forms a salient part of the present invention and is arranged in the case 1 opposite the light 4, both lights being energized by a battery 15, and are controlled by means of a manually operated switch 16 which cooperates with a pair of contacts 17 and 18 as hereinafter described.

Leads 19, 20 and 21 respectively, connect the light 4 with the switch and battery, and it will be obvious that by manipulating the switch 16 to engage the contact 17 (as shown in dotted lines), that the circuit will be closed and the light 4 energized accordingly.

A resistor 22 is associated with the comparison light 14, and includes a color indicating dial 23 which is suitably calibrated. Numerals 24 and 25 denote leads for connecting the light with the resistor, and with the lead 20 which is connected to the battery, and the leads 19 and 26 connect the battery and resistor with the switch to complete the circuit, so that when the switch 16 engages the contact 18 to close this circuit, the light 14 will be energized, the intensity of the light rays being regulated by means of the dial 23.

The operation of our improved colorimeter may be briefly stated as follows. The material to be tested designated at "M" is placed underneath the opening 2 in the bottom of the case 1. The switch 16 is manipulated to engage the contact 17 and the current then flows from the battery 15 through the incandescent lamp 4 and back through the other side of the circuit to the lead 19. The light is then condensed through the condensing lenses 5 and hence focused on the material covering the opening 2 that is to be tested.

Light rays emanating from the material to be tested influence the selenium cell 6 in accordance with the light intensity. These light fluctuations are accurately registered on the scale of the galvanometer 8 in a manner well understood.

The switch is then thrown to engage the terminal 18 (as shown in dotted lines), this energizes the comparison light 14, which is regulated by the resistance, the operator then rotates the dial 23 until the intensity of the light rays is sufficient to influence the selenium cell to the extent that the reading on the scale of the galvanometer is exactly the same as that produced by the light rays reflected from the material being tested, and by comparing the dial reading with a table of standards previously set up, and on which certain numbers designate certain shades and colors, the shade or color can be quickly and readily determined; this table of standards is not necessary, but one can be used if desired.

We wish to direct particular attention to the fact that both lights are supplied from the same source of energy, and inasmuch as both lights are of the same current consumption, like conditions will exist at all stages of the useful condition of the battery. Further, any difference in the light reflection of the various materials being tested is compensated for by the resistor 22, the dial 23 being manipulated to regulate the intensity of the rays of the light 14, so that said light rays will influence the selenium cell to the extent that the reading on the galvanometer, or measuring instrument used, will be exactly the same as the reading produced by the reflected light from the material being tested, and although the readings of the galvanometer may vary slightly from day to day, due to the change in the voltage of the battery, still the reading on the calibrated dial 23 will be accurate and the same for the same shades and colors, because both lights are supplied from the same source of energy.

The provision of a colorimeter of the above mentioned character will enable an accurate test or comparison to be procured, and furthermore the apparatus will at all times be positive and efficient in carrying out the purposes for which it is designed.

While we have shown a preferred embodiment of the invention, it is to be understood that minor changes in the size, shape, and arrangement of parts may be resorted to without departing from the spirit of the invention and the scope of the appended claims.

What we claim is:—

1. In a colorimeter, the combination of a case provided with an opening in the bottom thereof adapted to be covered by a piece of material the color of which is to be tested, a light in one end of the case and adapted to be focused on the material to be tested, a comparison light in the opposite end of the case, a source of electricity in a circuit with each light, contacts for the respective lights arranged in the circuit, a switch for cooperation with said contacts for selectively closing one circuit and opening the other, a selenium cell in said case directly opposite the opening, a source of electricity in circuit therewith, and a measuring instrument in said circuit for first measuring the intensity of the light rays reflected from the material, and then measuring the light rays reflected from the comparison light after the first mentioned light circuit has been opened.

2. In a colorimeter, the combination of a case provided with an opening in the bottom thereof adapted to be covered by a piece of material the color of which is to be tested, a light in one end of the case and adapted to be focused on the material to be tested, a comparison light in the opposite end of the case, a source of electricity in a circuit with each light, contacts for the respective lights arranged in the circuit, a switch for closing one circuit and opening the other, a selenium cell arranged within the case directly opposite the opening, an additional source of electricity in circuit with the selenium cell, means for measuring the intensity of the light rays reflected on the cell reflected from the first mentioned light, said means also measuring the intensity of the light rays from the comparison light after the first light circuit has been opened, and means for regulating said comparison light.

3. In a colorimeter, the combination of a light-tight case, a light in one end of the case, means for exposing a piece of material the color of which is to be tested to said light, a comparison light, a source of electricity in a circuit with each light, contacts for the respective lights arranged in the circuit, a resistance in one of said circuits, a selenium cell arranged within the case directly opposite the material, an additional source of electricity in circuit with the selenium cell, a measuring instrument arranged in the last mentioned circuit for measuring the intensity of the light rays reflected from the material, a switch for opening the first mentioned light circuit and closing the comparison light circuit, and means for regulating the intensity of the light rays of the comparison light.

4. In a colorimeter, the combination with a case having an opening adapted to be covered by a piece of colored material to be tested, a light within the case and adapted to be focused on said material, a selenium cell mounted on the case directly opposite said opening, a source of electricity in circuit with said cell, a measuring instrument in said circuit, a comparison light, a source of electricity in circuit with said light and comparison light, calibrated means for regulating the intensity of the comparison light and a switch for successively energizing said light and comparison light for securing a comparison reading on said measuring instrument.

5. In a colorimeter, the combination of a case having an opening adapted to be covered by a piece of colored material to be tested, a light within the case and adapted to be focused on the material, a source of electricity in circuit with said light, a selenium cell mounted in the case directly opposite said opening, a source of electricity in circuit with said cell, a galvanometer in said circuit for measuring the intensity of the light rays reflected on the cell, a comparison light, a source of electricity in circuit therewith, means for regulating the intensity of said comparison light, and a switch for successively closing said first mentioned light circuit, and then opening said circuit and closing the comparison light circuit, so that comparison readings may be obtained on the galvanometer.

6. In a colorimeter, the combination of a light-proof case, a light in one end of said case, means for exposing a piece of material the color of which is to be tested to said light, a comparison light in the opposite end of the case, a source of electricity in circuit with each light, a selenium cell arranged within the case directly opposite the material to be tested, an additional source of electricity in circuit with the selenium cell, a measuring instrument arranged in the last mentioned circuit for measuring the intensity of the light rays reflected from the material, a resistor for regulating the intensity of the light rays of the comparison light after the first mentioned light circuit has been opened and the comparison light circuit closed, and a calibrated color indicating dial for actuating said resistor.

7. In a colorimeter, the combination of a light-proof case having a light at one end thereof, means for exposing a piece of material the color of which is to be tested to said light, a selenium cell mounted in the case directly opposite the material, a source of electricity in circuit with the cell, a measuring instrument in said circuit for cooperation with the selenium cell for measuring the light rays reflected thereon, a comparison light in circuit with the light, a resistance in circuit with the comparison light for regulating the intensity of said comparison light, a color indicating dial for actuating said resistor, and a switch for successively energizing said light and comparison light.

WILLIAM E. REYNOLDS.
ARTHUR R. HEXT.